UNITED STATES PATENT OFFICE.

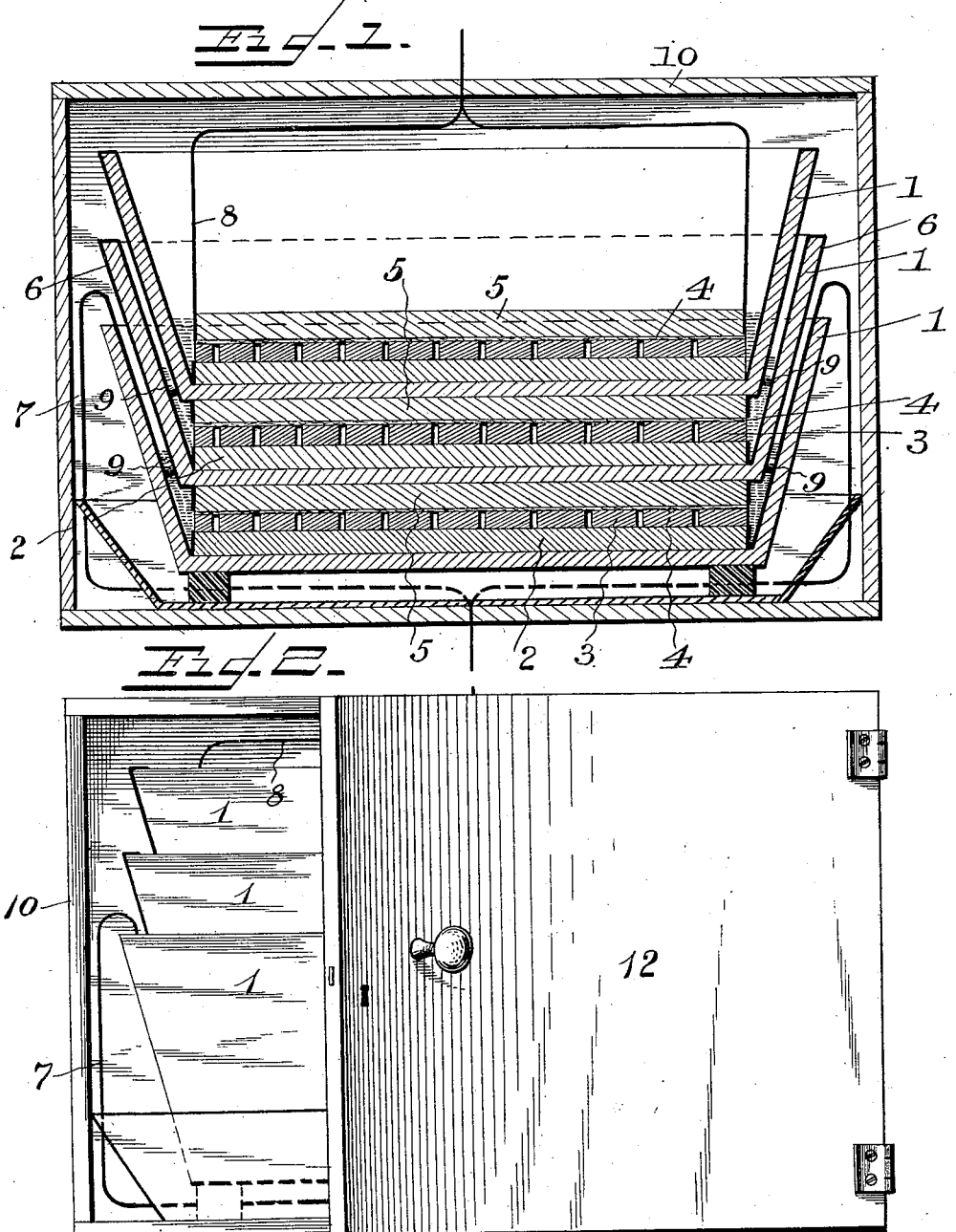

RALPH ASHLEY, OF PORT REPUBLIC, NEW JERSEY, ASSIGNOR, BY DIRECT AND MESNE ASSIGNMENTS, TO THE GUARANTOR ELECTRIC COMPANY, OF NEW JERSEY.

HIGH-TENSION BATTERY.

SPECIFICATION forming part of Letters Patent No. 591,265, dated October 5, 1897.

Application filed November 27, 1895. Renewed March 25, 1897. Serial No. 629,269. (No model.)

*To all whom it may concern:*

Be it known that I, RALPH ASHLEY, a citizen of the United States, and a resident of Port Republic, in the county of Atlantic and State of New Jersey, have invented certain new and useful Improvements in High-Tension Batteries; and I do hereby declare that the following is a full, clear, and exact description of the invention, which will enable others skilled in the art to which it appertains to make and use the same, reference being had to the accompanying drawings, which form a part of this specification.

My invention relates to secondary or storage batteries, and its object is to provide a battery of this character which shall be cheap, simple, and economical in construction, and which will develop an increased voltage or tension of electrical energy.

The invention consists, essentially, in a battery composed of a number of cups or trays, of rubber or other suitable insulating material, arranged in a vertical stack or pile, but out of contact with each other. The lower part of each cup or tray tapers toward the bottom, so that it will rest within the one next below it, and the bottom portion of each cup or tray, except the lowermost one, has secured to it a positive and negative plate, one being on the upper surface or inside of the tray and the other being on the lower surface or outside of the tray. The said lowermost tray has a plate on the upper or inside surface only and is seated in a lead tray, which will catch any acid which may boil or bubble over in charging. Interposed between each of said positive and negative plates is a perforated wooden or other non-conducting plate and a sheet of asbestos. The positive and negative plates are connected together in series by conductors which run up on the inside of the tray and then down on the outside of the tray and are secured to said plates by soldering or otherwise. By increasing the number of cells or trays a corresponding increase of voltage will be produced for each cell so added, making a series battery of a potential only limited by the number of trays or cells.

The battery is inclosed within a suitable box or casing provided with a hinged door, by which access may be had thereto.

The invention thus briefly outlined will now be described in detail, referring to the accompanying drawings, in which—

Figure 1 is a central longitudinal section of a battery and its casing constructed according to my invention. Fig. 2 is a side elevation of the same, the door of the casing being open.

The reference-numeral 1 designates a series of cups or trays tapering from the top to the bottom, so that they will nest or stack into each other. These cups or trays are made of hard rubber or other suitable non-conducting material, and any number desired or found convenient may be employed.

Secured to the upper or inner surface of each cup or tray is a positive plate 2, of any suitable material, and above the same is a perforated separating-plate 3, of wood or other insulating material, and on this plate is a sheet 4 of asbestos paper. Above this asbestos sheet is a negative plate 5, of any suitable material, which is preferably secured to the bottom of the pan next above it. The cups or trays contain the acidulated water-exciting fluid, and the cells thus formed are connected together in series by means of conductors 6, one end of which is soldered or otherwise secured to the negative plate of each cup or tray, and then extended up the outside of the tray, and then down upon the inside thereof and soldered or otherwise secured to the positive plate above. The positive plate of the lowermost cell is provided with a conductor or conductors 7, while the negative plate of the uppermost cell is provided with a conductor or conductors 8.

The number of the cells may be varied as desired and the number of conductors connecting the cells may also be varied.

Located in the cups or trays below the acid line are plugs 9, of insulating material, for preventing the cups or trays from contacting with each other, which would cause short-circuiting.

The battery so formed is inclosed within a casing or box 10, provided with a hinged door 12, having a lock and key, and the bottom tray is seated in a lead tray which will catch any acid which may boil over in charging.

In a battery such as above described electrolytic action will take place in the usual manner and the current will come to the positive pole at the lower cell, and from thence pass to the positive plate on the inside thereof, thence through the perforated plate and asbestos sheet to the negative plate, and then through the conductor to the positive plate above, and so on throughout the series, constantly increasing in voltage or tension until the uppermost cell is reached, when it will leave the battery through the negative conductor.

From the above it will be seen that I dispense with the use of all connecting bolts or nuts, so that not only will a much lighter battery be produced with a given voltage, and consequently occupy much less space, but it can be readily taken apart with ease and facility. As the said cups or trays do not contact with each other and there being no liability of the acid or exciting fluid of one cell crowding into the other, short-circuiting is impossible.

The invention will be found particularly applicable to lead-zinc batteries in which amalgamated electrodes are employed, as said electrodes lying in horizontal positions there is no liability of the mercury, by reason of its great specific gravity, running off of the electrode, and thereby exposing the plate to the action of the electrolyte, as is the case when the said electrodes are in a vertical position.

My invention will be found particularly adapted as a motive power for street-cars.

As is well known storage batteries as heretofore constructed have been found impracticable for running street-cars, as owing to their great weight the road-bed soon becomes seriously impaired and the rails destroyed.

Having thus fully described my invention, what I claim is—

1. A secondary or storage battery comprising the non-conducting cups or trays nested together but out of contact with each other, forming a vertical stack or pile, the positive and negative electrodes secured to the inner and outer sides of the bottom of said cups, the conductors connected with the negative electrodes of each cup passing up over the edge of the cups and then down to and connected with the positive electrode, substantially as described.

2. A secondary or storage battery comprising the non-conducting cups or trays superimposed upon but out of contact with each other, the positive and negative electrodes secured thereto, the perforated separating-plates, the asbestos sheet and the conductors secured to said negative electrodes, and running up the outside and then down the inside of the cup or tray above and secured to the positive electrodes thereon; substantially as described.

In testimony that I claim the foregoing as my own I have hereunto affixed my signature in presence of two witnesses.

RALPH ASHLEY.

Witnesses:
ANNA E. ALLEN,
EDNA ALLEN.